(12) United States Patent
Barkie et al.

(10) Patent No.: US 10,601,678 B2
(45) Date of Patent: Mar. 24, 2020

(54) LOCALIZED SENSOR QUALITY ANALYSIS AND CONTROL

(71) Applicant: INTERNATIONAL BUSINESS MACHINES CORPORATION, Armonk, NY (US)

(72) Inventors: Eric J. Barkie, Cary, NC (US); Benjamin Fletcher, Denver, CO (US); Timothy P. Roche, Oakland, CA (US); Shawn Stedman, San Francisco, CA (US)

(73) Assignee: NTERNATIONAL BUSINESS MACHINES CORPORATION, Armonk, NY (US)

( * ) Notice: Subject to any disclaimer, the term of this patent is extended or adjusted under 35 U.S.C. 154(b) by 37 days.

(21) Appl. No.: 15/685,361

(22) Filed: Aug. 24, 2017

(65) Prior Publication Data

US 2019/0068460 A1 Feb. 28, 2019

(51) Int. Cl.
*H04L 12/24* (2006.01)
*H04L 12/46* (2006.01)
(Continued)

(52) U.S. Cl.
CPC .......... *H04L 41/5009* (2013.01); *F24F 11/30* (2018.01); *H04L 12/46* (2013.01);
(Continued)

(58) Field of Classification Search
CPC ... H04L 67/42; H04L 67/2842; H04L 43/067; H04L 63/0884; H04L 65/601;
(Continued)

(56) References Cited

U.S. PATENT DOCUMENTS

| 5,394,934 A | 3/1995 | Rein et al. |
| 6,381,306 B1 | 4/2002 | Lawson et al. |

(Continued)

FOREIGN PATENT DOCUMENTS

| WO | 2010132791 A1 | 11/2010 |
| WO | 2016097822 A1 | 6/2016 |

OTHER PUBLICATIONS

Office Action dated Apr. 18, 2019, U.S. Appl. No. 15/804,895, filed Nov. 6, 2017, 18 pages.
(Continued)

*Primary Examiner* — Djenane M Bayard
(74) *Attorney, Agent, or Firm* — Conley Rose, P.C.

(57) ABSTRACT

An apparatus includes a memory comprising executable instructions and a processor coupled to the memory and configured to execute the instructions. Executing the instructions causes the processor to receive a broadcast including measurement data captured by a first sensor, verify integrity of the measurement data, perform a quality control analysis on the measurement data by analyzing the measurement data using a quality control algorithm to form an analysis result, generate a response for broadcasting the analysis result, and broadcast the analysis result. The response comprises a determination of pass when the quality control analysis indicates that the measurement data passes the quality control analysis and a determination of fail, a suspected cause of the failure, and a recommended resolution for the suspected cause of the failure when the quality control analysis indicates that the measurement data fails the quality control analysis.

13 Claims, 4 Drawing Sheets

(51) Int. Cl.
*H04M 15/00* (2006.01)
*H04L 29/08* (2006.01)
*F24F 11/30* (2018.01)
*H04L 29/06* (2006.01)
*H04M 1/24* (2006.01)
*F24F 110/50* (2018.01)
*F24F 11/38* (2018.01)

(52) U.S. Cl.
CPC ........ *H04L 12/4625* (2013.01); *H04L 67/125* (2013.01); *H04M 15/58* (2013.01); *H04M 15/8016* (2013.01); *H04M 15/8033* (2013.01); *F24F 11/38* (2018.01); *F24F 2110/50* (2018.01); *H04L 29/06* (2013.01); *H04M 1/24* (2013.01); *H04M 2215/0188* (2013.01); *H04Q 2213/13392* (2013.01)

(58) Field of Classification Search
CPC ............... H04L 12/16; H04L 2463/121; H04L 63/0281; H04L 63/10; H04L 63/101; H04L 61/2007; H04L 63/0272; H04L 63/061; H04L 63/0853; H04L 65/40; H04L 65/4084; H04L 67/1095; H04L 67/1097; H04L 67/30; H04L 9/0861; H04L 63/102; H04L 63/108; H04L 63/123; H04L 67/10; H04L 67/12; H04L 9/3231; H04L 9/3234; H04L 9/3236; H04L 9/3247; H04L 12/185; H04L 12/283; H04L 12/44; H04L 12/4641; H04L 2012/2843; G06F 19/3418; G06F 21/44; G06F 1/163; G06F 21/45; G06F 3/06; G06F 16/951; G06F 17/00
See application file for complete search history.

(56) References Cited

U.S. PATENT DOCUMENTS

| | | | |
|---|---|---|---|
| 6,404,735 | B1 | 6/2002 | Beshai et al. |
| 6,668,203 | B1* | 12/2003 | Cook ................ G05B 23/0229 700/27 |
| 6,708,209 | B1 | 3/2004 | Ebata et al. |
| 7,254,645 | B2 | 8/2007 | Nishi |
| 2006/0130022 | A1* | 6/2006 | Rahman ................... G06F 9/54 717/140 |
| 2009/0195401 | A1 | 8/2009 | Maroney |
| 2012/0197852 | A1 | 8/2012 | Dutta et al. |
| 2012/0197856 | A1* | 8/2012 | Banka ..................... H04L 67/12 707/706 |
| 2012/0215426 | A1 | 8/2012 | Goode, Jr. et al. |
| 2012/0215462 | A1* | 8/2012 | Goode, Jr. ......... A61B 5/14532 702/19 |
| 2012/0262298 | A1* | 10/2012 | Bohm ................ G01N 27/3274 340/604 |
| 2013/0316461 | A1 | 11/2013 | Fujita |
| 2014/0278186 | A1 | 9/2014 | Herzl et al. |
| 2016/0085955 | A1* | 3/2016 | Lerner .................... G06F 21/31 726/20 |
| 2016/0150289 | A1* | 5/2016 | Lee ...................... H04N 21/812 725/5 |
| 2016/0301707 | A1 | 10/2016 | Cheng et al. |
| 2017/0046309 | A1 | 2/2017 | Hubauer et al. |
| 2017/0094018 | A1 | 3/2017 | Ekstrom et al. |
| 2017/0126704 | A1 | 5/2017 | Nandha Premnath et al. |
| 2017/0208493 | A1* | 7/2017 | Masson ................... H04W 4/70 |
| 2018/0313799 | A1 | 11/2018 | Cheng et al. |
| 2018/0313942 | A1 | 11/2018 | Wu et al. |

OTHER PUBLICATIONS

"List of IBM Patents or Applications Treated as Related," dated Apr. 25, 2019, 2 pages.

* cited by examiner

LOCALIZED SENSOR QUALITY ANALYSIS AND CONTROL

BACKGROUND

The present disclosure relates to the field of electronic sensors, and more specifically to localized sensor quality analysis and control.

Electronic sensors provide measurements, observations, or other data related to the environment around or visible to the sensors. Various factors may influence a degree of accuracy of the sensors. Therefore, it may be desirable to determine a quality level of data output by sensors to determine whether additional action may be recommended.

SUMMARY

In an embodiment, the present disclosure includes an apparatus including a memory comprising executable instructions and a processor coupled to the memory and configured to execute the instructions. Executing the instructions causes the processor to receive a broadcast including measurement data captured by a first sensor, verify integrity of the measurement data, perform a quality control analysis on the measurement data by analyzing the measurement data using a quality control algorithm to form an analysis result, generate a response for broadcasting the analysis result, wherein the response comprises a determination of pass when the quality control analysis indicates that the measurement data passes the quality control analysis and a determination of fail, a suspected cause of the failure, and a recommended resolution for the suspected cause of the failure when the quality control analysis indicates that the measurement data fails the quality control analysis, and broadcast the analysis result.

In yet another embodiment, the present disclosure includes a computer program product for localized sensor quality analysis and control, the computer program product comprising a computer readable storage medium having program instructions embodied therewith, the program instructions executable by a processor. Executing the instructions causes the processor to receive a broadcast including measurement data captured by a first sensor, verify integrity of the measurement data, perform a quality control analysis on the measurement data by analyzing the measurement data using a quality control algorithm to form an analysis result, generate a response for broadcasting the analysis result, wherein the response comprises a determination of pass when the quality control analysis indicates that the measurement data passes the quality control analysis and a determination of fail, a suspected cause of the failure, and a recommended resolution for the suspected cause of the failure when the quality control analysis indicates that the measurement data fails the quality control analysis, and broadcast the analysis result.

DETAILED DESCRIPTION

Figure 1:
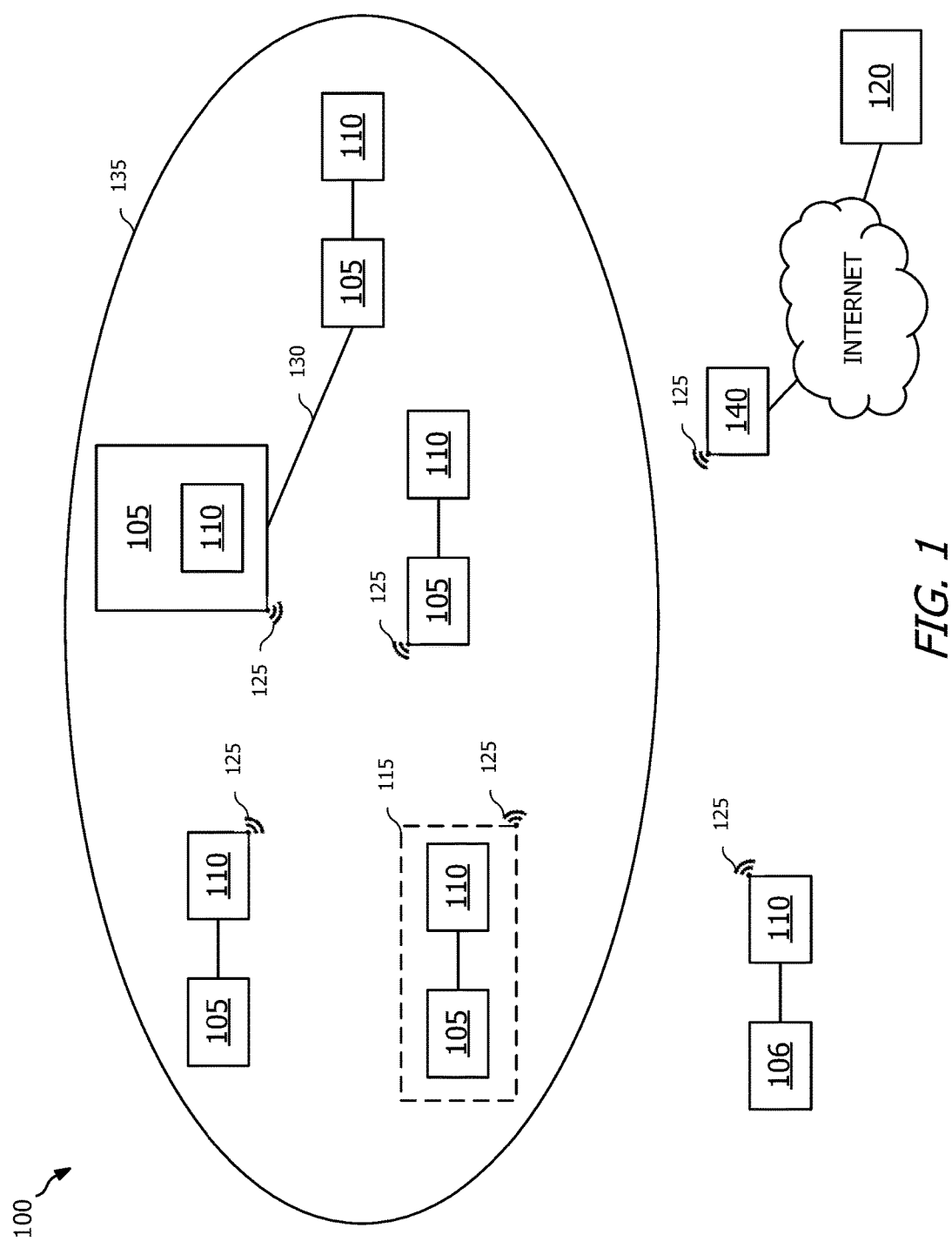
FIG. 1 depicts a block diagram of a block diagram of a sensor system in accordance with various embodiments.

With the proliferation of Internet of Things (IoT) devices, it is probable that IoT devices having a similar function (e.g., sensors configured to measure or detect a similar condition) may be installed and may operate in areas located in relatively close physical proximity to each other. Prior to such proliferation, when IoT devices may be more sparsely deployed, data may flow from the IoT devices to cloud-computing devices via the Internet such that the cloud-computing devices may analyze the data and provide quality control for the IoT devices. In some circumstances, this approach may utilize significant amounts of bandwidth for the transmission of raw sensor data from the IoT devices to the cloud-computing devices, as well as for transmission of the quality control instructions from the cloud-computing devices to the IoT devices. As IoT devices become more ubiquitous and are installed and operating in relatively close physical proximity to each other, it may become unnecessary to provide all quality control for each of the IoT devices through cloud-computing devices via the Internet. Instead, the IoT devices themselves may provide quality control and/or calibration for each other when they are located within a defined distance of each other and have a similar, if not same, functionality. Such an approach may result in improvements to efficiency and cost by reducing a reliance on long-haul network communications to and from the cloud-computing resources, as well as reducing network bandwidth utilized for IoT device operations.

Disclosed herein are embodiments that provide for calibration of electronic sensors based on localized data, for example, such as data collected from one or more similar sensors located within a defined perimeter centered on a location of the electronic sensor undergoing calibration. Each of the sensors (e.g., the sensor undergoing calibration and any sensors upon which the calibration may be based) may be located proximate to each other (e.g., in a same general geographic area) and may include a similar function. For example, each of the sensors that may be involved in the calibration may at least share the function for which calibration is occurring, while each sensor may also include additional functionality. For example, if the sensors are environmental or weather sensors and a temperature functionality of the sensor is being calibrated (either by calibrating a thermometer if the sensor is only for temperature or calibrating a temperature function if the sensor is multipurpose or is a sensor suite including many individual and varying sensors), temperature data from other sensors proximate to the sensor being calibrated may be used for calibrating the sensor undergoing calibration.

In some embodiments, the sensors may communicate with each other without resorting to Internet-based communications. For example, the sensors may communicate with each other via short-range communications protocols or methods existing at the data link layer (layer 2) of the Open Systems Interconnect (OSI) model. Examples of such short-range communication methods may include wireless connections such as BLUETOOTH, WIFI, ZWAVE, or ZigBee. Wired communication methods such as Ethernet may also be used. Each sensor may be capable of communicating using any one or more of the communications protocols and not all of the sensors may include capabilities for communicating using the same communications protocols.

In some embodiments, the sensors may be a part of a sensor suite in which each sensor includes multiple measurement or observation functionality, in which multiple sensors each having different functionalities are present, and/or in which only one sensor or sensor functionality is present. The sensor suite may further include, or be coupled to, computing resources (e.g., one or more processing elements such as processors, digital logic, application specific integrated circuits (ASICs), etc.), network resources (e.g., such as antennas, transmitters, receivers, communications protocol interfaces, etc.), storage, and/or other computing resources such as a display, user input devices, or output devices (visual or audio output). The sensor suite and computing resources may be located in a same enclosure, may be located proximate to a same enclosure (e.g., at least some sensors of the sensor suite may be mounted on an exterior or otherwise exposed to an exterior of the enclosure), or the sensors of the sensor suite and the computing resources may be located separately (e.g., in one or more separate enclosures that are communicatively coupled together).

Referring now to FIG. 1, a block diagram of a sensor system 100 in accordance with various embodiments is shown. The sensor system 100 includes a plurality of sensor suites 105. The sensor suites 105 are distributed proximate to each other in a substantially same geographically area. At least some of the sensor suites 105 may be in communication with other of the sensor suites 105 via short-range wireless 125 or wired 130 communications protocols operating an OSI layer 2. These protocols may include any one or more of BLUETOOTH, WIFI, ZWAVE, ZigBee, or Ethernet. At least some of the sensor suites 105 may also be in communication with one or more servers via the Internet. Internet connectivity may be achieved using one or more of the above short-range wireless or wired communications protocols to communicatively couple the sensor suites 105 to a network device 140 such as a router, gateway, or other like device that may be configured to provide the Internet connectivity to the sensor suites 105.

At least some of the sensor suites 105 may be communicatively coupled to local (e.g., physically proximate) computing resources 110 configured to process at least some data relating to measurements or observations made by at least some of the sensor suites 105 (e.g., the sensor suites 105 to which the computing resources 110 are communicatively coupled). In some embodiments, multiple sensor suites 105 may be communicatively coupled to a same computing resource 110, while in other embodiments a sensor suite 105 may be communicatively coupled to its own dedicated computing resource 110 or may be communicatively coupled to no computing resources 110 other than via a connection to the Internet (e.g., only coupled to remote computing resources such as cloud-computing). In some embodiments, a sensor suite 105 and the computing resource 110 to which it is communicatively coupled may share a same enclosure 115. In other embodiments, the computing resource 110 may be incorporated into, or be a part of, a sensor suite 105.

Each of the sensor suites 105 may take measurements and/or perform observations related to conditions existing around or proximate to the respective sensor suite 105. As an illustrative example and without limitation, at least some of the sensor suites 105 may perform measurements related to weather conditions such as temperature, humidity, air quality, atmospheric pressure, wind speed, wind direction, rainfall, solar radiation, and/or other weather or environmental conditions. When a first of the sensor suites 105 performs measurements to obtain measurement data, the first sensor suite 105 may broadcast the measurement data. The broadcast may be performed substantially independently by components of the first sensor suite 105, or the broadcast may be performed at least partially using components of computing resources 110 coupled to the first sensor suite 105. The broadcast may be sent with a transmit power sufficient to enable receipt of other sensor suits 105 within broadcast range 135 to receive the broadcast while not having sufficient power to enable sensor suite 106 outside of broadcast range 135 to receive the broadcast.

In some embodiments, the broadcast may include other information in addition to the measurement data. For example, the broadcast may also include any one or more of a device address of a sensor suite 105 that performed the measurements to record the measurement data, a sequence identification, a time stamp indicating a time at which the measurement data was recorded (or alternatively, a time at which the measurement data was broadcast), a location of the sensor suite 105 that performed the measurements (e.g., an elevation, latitude and longitude, street address, or other location identifying information), a transmit strength at which the broadcast is being transmitted (and/or an expected or pre-calibrated received signal strength indicator (RSSI) for the broadcast), a signature that may be used to authenticate the broadcast, and/or a cyclic redundancy check (CRC) code. Optionally, the broadcast may also include a time to live (TTL) value for the broadcast and/or for the measurement data. The measurement data included in the broadcast may include a type of the measurement (e.g., temperature, humidity, pressure, etc.), a value of the measurement, a unit of measurement associated with the value, a precision value for the sensor suite 105 that performed the measurement, a refresh rate indicating a rate at which the sensor suite 105 that performed the measurement refreshes the value (e.g., by performing another measurement), an estimated applicability range of the measurement data (e.g., such as expressed by a distance radius extending outward from the location at which the measurement data was obtained), and/or a confidence index indicating a confidence level of the sensor suite 105 that performed the measurement in the measurement data.

Other sensor suites 105 within the broadcast range 135 of the first sensor suite 105 may receive the broadcast of the first sensor suite 105 and perform quality control analysis of the measurement data of the first sensor suite 105. In some embodiments, multiple other sensor suites 105 may perform the quality control analysis while in other embodiments only one sensor suite 105 may perform the quality control analysis. The other sensor suites 105 may perform the analysis via computing resources 110 coupled to the other sensor suites 105, respectively, or via computing resources 110 within the other sensor suites 105 themselves. The other sensor suites 105 may receive the broadcast substantially independently by components of the other sensor suites 105, respectively, or the other sensor suites 105 may receive the broadcast at least partially using components of computing resources 110 coupled to the other sensor suites 105, respectively.

Upon receipt of the broadcast, the other sensor suites 105 may validate the CRC code and the broadcast to verify integrity of the data of the broadcast and of the transmitter of the broadcast, respectively. After verifying via the CRC code check that errors have not occurred in the broadcast, and that the transmitter of the broadcast is authentic via the signature, the other sensor suites 105 may analyze the measurement data using one or more quality control algorithms. The algorithms may be known algorithms (e.g., published or open source algorithms) or the algorithms may be proprietary algorithms developed by a manufacturer or software provider of the sensor suites 105 (e.g., such as a provider of a software development kit (SDK) for use at least partially by or with the sensor suites 105). In some embodiments, the quality control algorithms may comply with one or more standards or specifications, such as, for example, a National Oceanic and Atmospheric Administration (NOAA) National Weather Service (NWS) specification. In some embodiments, the measurement data of the broadcast may be compared to other measurement data. For example, the other measurement data may be downloaded by the other sensor suites 105 from a remote data source via a network such as the Internet, or may be received in other broadcasts from sensor suites 105. For example, a single sensor suite 105 may receive broadcasts from a plurality of other sensor suites 105 and in performing quality control analysis on measurement data included in one of those broadcasts, may utilize measurement data from other of the broadcasts.

As an example, if a sensor suite 105 receives five broadcasts including measurement data from a geographic area in the immediate vicinity of the sensor suite 105, the sensor suite 105 may use the measurement data from each of the broadcasts in determining whether measurement data included in any one of the broadcasts passes the quality control analysis. For example, when one of the broadcasts includes measurement data that varies more than a threshold amount from the measurement data of the remaining broadcasts (either individually or on average), and based on the locations at which the measurement data of the respective broadcasts was recorded, the quality control analysis may indicate that there is a high probability that the measurement data that varies more than the threshold amount does not accurately represent actual conditions at the location at which the measurement data was recorded and therefore the measurement data that varies more than the threshold amount has failed the quality control analysis. As another example, instead of or in addition to receiving separate broadcasts including measurement data, the sensor suite 105 performing the quality control analysis may refer to a state table including verified measurement data for other sensor suites 105 within the broadcast range 135 of the sensor suite 105 that is performing the quality control analysis. In this way, multiple sensor suites 105 may perform quality control analysis for one another locally without resorting to transmitting measurement data via the Internet to cloud-based analysis platforms for the quality control analysis. Performing the quality control analysis locally may have certain benefits that may include reduced bandwidth consumption on a network connection connecting the sensor suite 105 to the Internet, reduced cost stemming from the reduced bandwidth consumption, more rapid quality control analysis determinations and recalibrations by removing or reducing delay in the quality control analysis by performing the quality control analysis locally among other sensor suites 105, and more accurate and/or efficient quality control analysis resulting from performing the quality control analysis using the other sensor suites 105 that are located near the first sensor suite 105 and therefore have definite knowledge of location and surrounding conditions. Performing the quality control analysis locally may further improve the sensor suites 105 by increasing the accuracy with which the sensor suites 105 perform their measurements, increasing the efficiency of operation of the sensor suites 105 by utilizing less bandwidth for operation, and providing more accurate calibration instructions based on calibration determinations being made locally by other sensor suites 105 located proximate to a sensor suite 105 that will be performing the calibration.

After a sensor suite 105 has performed the quality control analysis, in some embodiments there may be three possible outcomes including pass, fail, and unknown. When measurement data passes the quality control analysis, the measurement data may be saved in the state table of the sensor suite 105 that performed the quality control analysis. The measurement data may be saved, for example, to use in later quality control analysis that may include historical analysis as a component of their quality control analysis. The saved data may include, for example, a timestamp indicating when the data was saved, a timestamp indicating when the saved data expires or should no longer be considered valid for use in quality control analysis, and results of the quality control analysis (e.g., an analysis determination, confidence level, supporting information, etc.). When the measurement data passes the quality control analysis, the sensor suite 105 that performed the quality control analysis may additionally broadcast observation analysis results of the quality control analysis. The observation analysis results may include, for example, a device address of the sensor suite 105 that performed the quality control analysis, a sequence identification indicating the measurement data for which the quality control analysis was performed, a timestamp indicating when the sensor suite 105 performed the quality control analysis, a location of the sensor suite 105 that performed the quality control analysis, a transmit strength at which the broadcast is being transmitted (and/or an expected or pre-calibrated RSSI for the broadcast), a determination indicating passage of the quality control analysis, a confidence level in the determination, supporting information that supports the determination (e.g., such as reference to a particular quality control algorithm that was passed), a confidence level in the asserted supporting information, a signature that may be used to authenticate the broadcast, and/or a CRC code.

When measurement data fails the quality control analysis, the measurement data may be discarded by the sensor suite 105 that performed the quality control analysis. The sensor suite 105 that performed the quality control analysis may additionally broadcast observation analysis results of the quality control analysis. The observation analysis results may include, for example, a device address of the sensor suite 105 that performed the quality control analysis, a sequence identification indicating the measurement data for which the quality control analysis was performed, a timestamp indicating when the sensor suite 105 performed the quality control analysis, a location of the sensor suite 105 that performed the quality control analysis, a transmit strength at which the broadcast is being transmitted (and/or an expected or pre-calibrated RSSI for the broadcast), a determination indicating failure of the quality control analysis, a confidence level in the determination, suspected reasons (if any) for the failure, suggested corrective actions (if any) for resolving the failure and the reasons for the failure, a signature that may be used to authenticate the broadcast, and/or a CRC code.

The suspected reasons for the failure may include, for example, the measurement data being incorrect, a sensor going bad (such that the sensor no longer provides good or accurate measurement data), a problem with the quality control algorithm(s) used to analyze the measurement data, the sensor being stuck in a non-optimal or undesirable position, etc. The suggested corrective actions may include, for example, recalibrating the sensor (such as based on measurement data received from other nearby sensors or an analysis of historical measurement data indicating that measurements of the sensor suite 105 for which corrective actions are suggested are consistently in error by a given percentage or value), cleaning or resetting of the sensor suite 105 for which corrective actions are suggested, replacement of the sensor suite 105 for which corrective actions are suggested, broadcast rate adjustment for subsequent broadcasts including measurement data of the sensor suite 105 for which corrective actions are suggested, etc. In some embodiments, the broadcast indicating a failure of the quality control analysis may further include supporting information such as an indication of an algorithm which supports the assertion of the measurement data being incorrect, a confidence level in the assertion of the algorithm, a confidence level in the suspected reasons for the failure, a confidence level in the suggested corrective actions, etc.

When the sensor suite 105 cannot determine whether the measurement data has passed or failed the quality control analysis (e.g., an analysis outcome of unknown occurs), the sensor suite 105 that performed the quality control analysis may broadcast an unknown analysis result of the quality control analysis. The unknown analysis result may include, for example, a device address of the sensor suite 105 that performed the quality control analysis, a sequence identification indicating the measurement data for which the quality control analysis was performed, a timestamp indicating when the sensor suite 105 performed the quality control analysis, a location of the sensor suite 105 that performed the quality control analysis, a transmit strength at which the broadcast is being transmitted (and/or an expected or pre-calibrated RSSI for the broadcast), a determination indicating an unknown result of the quality control analysis, a confidence level in the determination, supporting information that supports the determination, a confidence level in the asserted supporting information, a signature that may be used to authenticate the broadcast, and/or a CRC code.

The first sensor suite 105 that performed the measurements resulting in the measurement data for which the other sensor suites 105 performed the quality control analysis may receive the analysis results that are broadcast by the other sensor suites 105. In response to receipt of the analysis results, the first sensor suite 105 may take no action (e.g., such as when the analysis results indicate passage of the quality control analysis) or perform one or more actions (e.g., such as when the analysis results indicate failure of the quality control analysis or an unknown analysis result). For example, in response to receipt of analysis results indicating failure of the quality control analysis, the first sensor suite 105 may generate and transmit a notification to a user, may illuminate and/or sound an alert indicating a problem with the first sensor suite 105, may power down the first sensor suite 105, may restart and/or reset the first sensor suite 105, may perform a recalibration (e.g., such as setting or modifying a bias value to compensate for a historical variation of measurements made by the first sensor suite 105 from measurement values accepted as accurate), and/or may execute a physical alteration to the first sensor suite 105 (e.g., such as activating a motor to reposition the first sensor suite 105, executing a cleaning operation of the first sensor suite 105 that may utilize water or air to clear an opening of the first sensor suite 105, etc.).

Sensor suites 105 that are within the broadcast range 135 of the sensor suite(s) 105 that performed the quality control analysis may also receive the broadcast analysis results. These sensor suites 105 may also save information related to the quality control analysis to a state table for use in subsequent quality control analyses, for calibration of these sensor suites 105, or for any other purpose.

In some embodiments, one or more of the sensor suites 105 may report the analysis results and/or the measurement data to a designated reporting entity 120. For example, after the sensor suites 105 have performed the quality control analysis offline (e.g., in an Internet-independent manner that does not necessitate transmitting the measurement data via the Internet for performance of the quality control analysis), one or more of the sensor suites 105 may transmit at least some of the measurement data that passes the quality control analysis to the designated reporting entity 120. The designated reporting entity 120 may be, for example, a cloud-computing entity, a server, a data aggregation service, and/or any other service, entity, or device that may collect measurement data for use in other applications or to provide to other parties. In some embodiments, the first sensor suite 105 may itself provide quality control analysis for another sensor suite 105 in the sensor system 100 in a manner substantially similar to the above in addition to broadcasting measurement data captured by the first sensor suite 105 and receiving analysis results for the measurement data captured by the first sensor suite 105.

Figure 2:
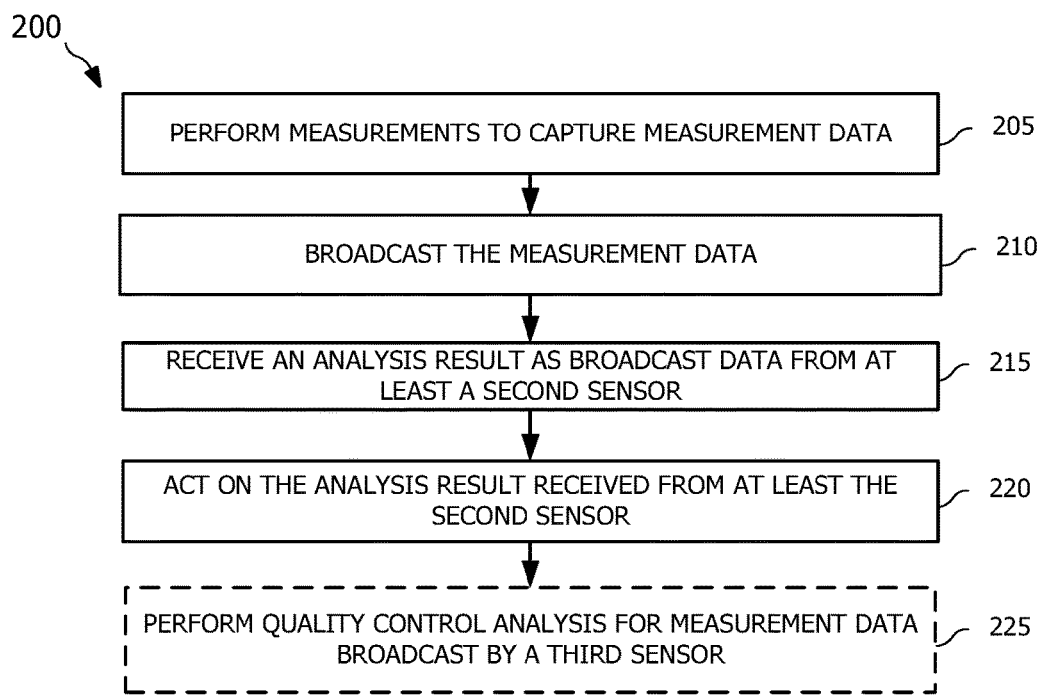
FIG. 2 depicts a flowchart of a method of sensor operation in accordance with various embodiments.

Referring now to FIG. 2, a flowchart of a method 200 of sensor operation according to various embodiments is shown. The method 200 may be performed, for example, by a first sensor (e.g., individually or as a component of a sensor suite such as the first sensor suite 105, discussed above with reference to FIG. 1) to capture measurement data and broadcast the measurement data to other sensor suites for quality control analysis. At operation 205, the first sensor performs measurements or observations to capture measurement data. The measurement data may indicate, for example, characteristics of conditions existing within a given proximity of the first sensor.

At operation 210, the first sensor broadcasts the measurement data to enable other sensors located proximate to the first sensor to receive the measurement data. In some embodiments, the measurement data is broadcast at OSI layer 2 (which may also be referred to as a data link layer) using short-range wireless communication protocols or wired communication protocols. In some embodiments, the first sensor may also broadcast additional information along with the measurement data in a broadcast payload. The additional information may include, for example, an electronic address of the first sensor, a sequence identification of the measurement data, a timestamp indicating a day and/or time at which the first sensor captured the measurement data, information relating to a physical location of the first sensor (e.g., elevation, latitude and longitude, etc.), a transmit strength at which the broadcast is being transmitted by the first sensor, a signature of the first sensor, and/or a CRC code. The measurement data may include, for example, a time to live value for which the measurement data is deemed to be valid, a type of measurement represented by the measurement data, a value of the measurement data, a unit of measurement for the measurement data, a degree of precision for the measurement data, a refresh rate of the measurement data (e.g., how of often measurements are performed to refresh the measurement data), an estimated applicability range for the measurement data (e.g., a radial distance extending outward from the first sensor and defining an area for which similar measurement data would be expected based on geography), and a level of confidence of the first sensor in the measurement data.

At operation 215, the first sensor receives an analysis result as broadcast data from at least a second sensor located proximate to (e.g., within a broadcast range of) the first sensor. The analysis result may include, for example, a quality control analysis result that indicates whether the measurement data broadcast by the first sensor passed a quality control analysis performed by the second sensor, whether the measurement data broadcast by the first sensor failed the quality control analysis performed by the second sensor, or whether the quality control analysis performed by the second sensor returned an unknown result. As discussed above with respect to FIG. 1, the analysis results may include further information such as information supporting the determination of pass or fail, confidence levels, possible causes of a failed quality control analysis, and/or possible solutions or remedies to a failed quality control analysis.

At operation 220, the first sensor acts on the analysis result received from the second sensor. For example, when the analysis result indicates that the measurement data passed the quality control analysis, the first sensor may transmit at least some of the measurement data (or other data derived from, or depending on, the measurement data) via the Internet (e.g., to a reporting or data aggregation entity). In addition, or alternatively, the first sensor may store the measurement data (and/or the analysis result) to a state table of the first sensor for later use as known good data for self-performing quality control analysis or performing quality control analysis for other sensors. When the analysis result indicates that the measurement data failed the quality control analysis, the first sensor may take one or more corrective actions. For example, the first sensor may notify a user of an error, may power down, may restart, may reset itself, may perform a calibration of itself (e.g., by configuring a software bias for application to subsequent measurements captured by the first sensor), and/or may make a physical modification to itself (e.g., such as a change to a physical position of the first sensor (repositioning) or activating self-cleaning a portion of the first sensor). In some embodiments, receipt of the analysis result including an indication that the measurement data failed the quality control analysis, or an analysis result including a recommended solution for a suggested cause of the failure, may instruct, direct, command, or otherwise cause the first sensor to automatically perform one or more of the foregoing corrective actions under direction of the second sensor. Optionally, at operation 225, the first sensor performs quality control analysis for measurement data broadcast by a third sensor. A method of performing the quality control analysis is further described below with respect to FIG. 3.

Figure 3:
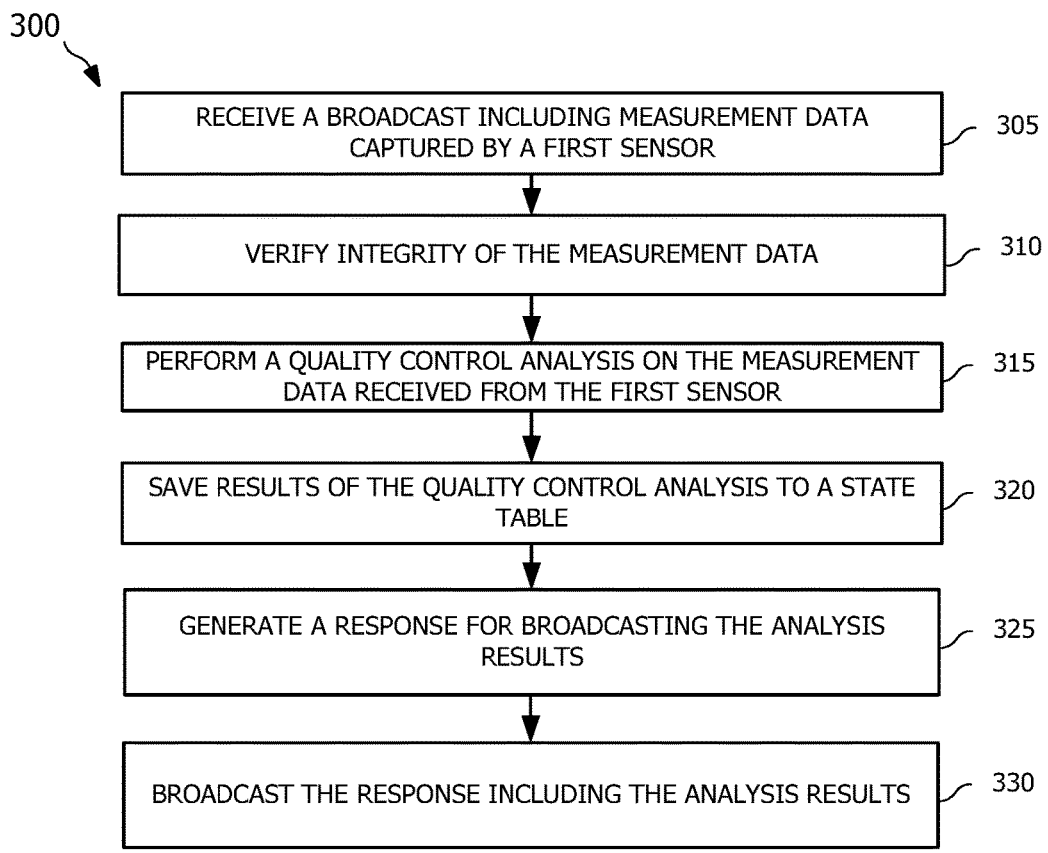
FIG. 3 depicts a flowchart of a method of sensor measurement data quality control analysis in accordance with various embodiments.

Referring now to FIG. 3, a flowchart of a method 300 of sensor measurement data quality control analysis according to various embodiments is shown. The method 300 may be performed, for example, by a second sensor (e.g., individually or as a component of a sensor suite such as a sensor suite 105, discussed above with reference to FIG. 1) to perform quality control analysis on data received from a first sensor. At operation 305, the second sensor receives a broadcast including measurement data captured by the first sensor. The broadcast may be, for example, broadcast at OSI layer 2 and may be transmitted via wired or wireless communication protocols. At operation 310, the second sensor verifies integrity of the measurement data. For example, the second sensor may verify the integrity of the measurement data by analyzing additional information broadcast with the measurement data (e.g., as discussed above with respect to FIG. 1). For example, the second sensor may analyze one or more of a CRC code or a signature (such as a signature authenticating the first sensor) broadcast with the measurement data to verify the integrity of the measurement data.

At operation 315, the second sensor performs a quality control analysis on the measurement data received from the first sensor. The quality control analysis may be performed using any one or more, or combination of, known or proprietary quality control algorithms. For example, the quality control algorithms may be open source algorithms, may be algorithms generated and released through research efforts such as government or university research, may be proprietary algorithms generated by a software and/or hardware provider of the second sensor (e.g., such as a provider of a SDK for use at least partially by or with the second sensor), or any other suitable quality control algorithm deemed to be sufficiently accurate for use by the second sensor. In some embodiments, at least some of the algorithms may adhere to guidelines or specifications for performing quality control analysis. For example, when the first sensor and the second sensor are weather sensors, the quality control algorithms may adhere to guidelines or specifications developed and/or published by the NOAA.

At operation 320, the second sensor saves the results of the quality control analysis, and optionally at least some of the measurement data on which the quality control analysis was performed, to a state table of the second sensor. The second sensor may save the results of the quality control analysis for use in a subsequent quality control analysis by the second sensor of measurement data from the first sensor, of the second sensor itself, or of other nearby sensors.

At operation 325, the second sensor generates a response for broadcasting the analysis results. The analysis results may indicate that the measurement data passed the quality control analysis, the measurement data failed the quality control analysis, or that the quality control analysis had an unknown result. In some embodiments the response may include additional information along with the analysis results. The additional information may include supporting information that supports the determination of pass or fail, information such as a CRC code and/or signature for verifying integrity of the analysis result broadcast, possible causes and/or solutions when the measurement data fails the quality control analysis, and/or any other suitable information. At operation 330, the second sensor broadcasts the response including the analysis result via wired or wireless communication protocols operating at OSI layer 2. Optionally, in some embodiments, the communication protocols may be operating at any other suitable network layer (e.g., other than OSI layer 2) for broadcasting or transmitting data.

Figure 4:
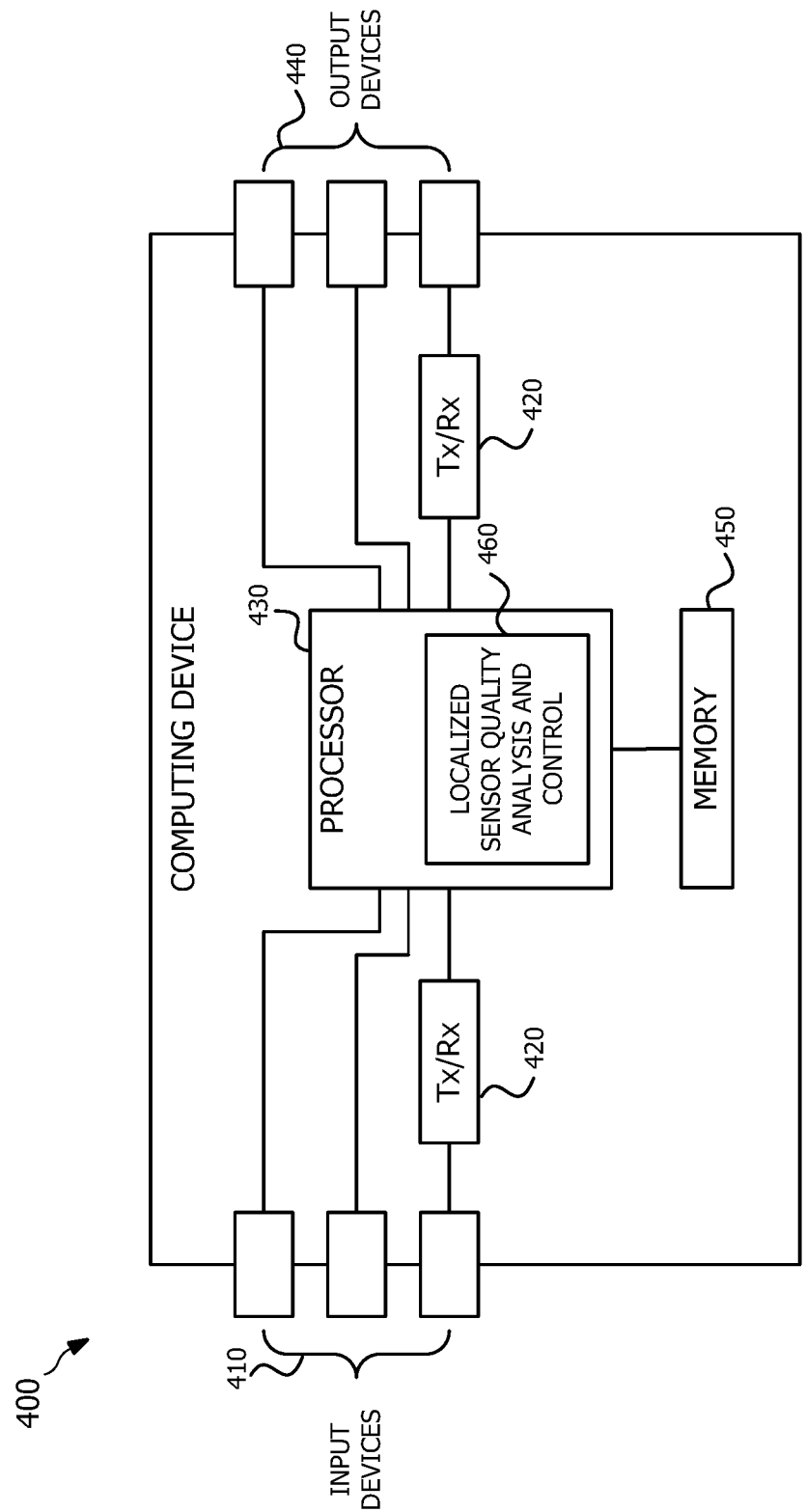
FIG. 4 depicts a computing device in accordance with various embodiments.

With reference now to FIG. 4, a schematic diagram of a computing device 400 according to various embodiments is shown. Computing device 400 may be any suitable processing device capable of performing the functions disclosed herein such as a computer system, a server, a sensor, a sensor suite, a computing resource, a cloud-computing node, a cognitive computing system, etc. Computing device 400 is configured to implement at least some of the features/methods disclosed herein, for example, the localized environmental sensor quality analysis and control, such as described above with respect to sensor system 100, method 200, and/or method 300. For example, the computing device 400 may be, or may implement, any one or more of the sensor suites 105 (or individual sensors which may together form a sensor suite) and/or the computing resources 110. In various embodiments, for instance, the features/methods of this disclosure are implemented using hardware, firmware, and/or software (e.g., such as software modules) installed to run on hardware. In some embodiments, the software may utilize one or more SDKs or SDK functions to perform at least some of the features/methods of this disclosure.

Computing device 400 is a device (e.g., a computer system, a server, a sensor, a sensor suite, a computing resource, a cloud-computing node, a cognitive computing system, etc.) that localized sensor quality analysis and control, for example, by performing quality control for sensor measurement data of a geographically proximate sensor in an Internet-independent manner. The computing device 400 may be an all-in-one device that performs each of the aforementioned operations, or the computing device may be a node that performs any one or more, or portion of one or more, of the aforementioned operations. In one embodiment, the computing device 400 is an apparatus and/or system configured to provide the localized sensor quality analysis and control as described with respect to sensor system 100, method 200, and/or method 300, for example, according to a computer program product executed on, or by, at least one processor.

The computing device 400 comprises one or more input devices 410. Some of the input devices 410 may be microphones, keyboards, touchscreens, buttons, toggle switches, cameras, sensors, and/or other devices that allow a user to interact with, and provide input to, the computing device 400 and/or enable the computing device 400 to provide observations or measurements related to conditions (e.g., environmental conditions) existing around the computing device 400. Some other of the input devices 410 may be downstream ports coupled to a transceiver (Tx/Rx) 420, which are transmitters, receivers, or combinations thereof. The Tx/Rx 420 transmits and/or receives data to and/or from other computing devices via at least some of the input devices 410. Similarly, the computing device 400 comprises a plurality of output devices 440. Some of the output devices 440 may be speakers, a display screen (which may also be an input device such as a touchscreen), lights, or any other device that allows a user to interact with, and receive output from, the computing device 400. At least some of the output devices 440 may be upstream ports coupled to another Tx/Rx 420, wherein the Tx/Rx 420 transmits and/or receives data from other nodes via the upstream ports. The downstream ports and/or the upstream ports may include electrical and/or optical transmitting and/or receiving components. In another embodiment, the computing device 400 comprises one or more antennas (not shown) coupled to the Tx/Rx 420. The Tx/Rx 420 transmits and/or receives data from other computing or storage devices wirelessly via the one or more antennas. In yet other embodiments, the computing device 400 may include additional Tx/Rx 420 such that the computing device 400 has multiple networking or communication interfaces, for example, such that the computing device 400 may communicate with a first device using a first communication interface (e.g., such as via the Internet) and may communicate with a second device using a second communication interface (e.g., such as another computing device 400 without using the Internet).

A processor 430 is coupled to the Tx/Rx 420 and at least some of the input devices 410 and/or output devices 440 and is configured to implement the localized sensor quality analysis and control. In an embodiment, the processor 430 comprises one or more multi-core processors and/or memory modules 450, which functions as data stores, buffers, etc. The processor 430 is implemented as a general processor or as part of one or more application specific integrated circuits (ASICs), field-programmable gate arrays (FPGAs), and/or digital signal processors (DSPs). Although illustrated as a single processor, the processor 430 is not so limited and alternatively comprises multiple processors. The processor 430 further comprises processing logic configured to execute a localized sensor quality analysis and control computer program product 460 that is configured to implement the localized sensor quality analysis and control as described above with respect to sensor system 100, method 200, and/or method 300.

FIG. 4 also illustrates that a memory module 450 is coupled to the processor 430 and is a non-transitory medium configured to store various types of data. Memory module 450 comprises memory devices including secondary storage, read-only memory (ROM), and random access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 450 may be used to house the instructions for carrying out the various embodiments described herein. For example, the memory module 450 may comprise the localized sensor quality analysis and control computer program product 460, which is executed by processor 430.

It is understood that by programming and/or loading executable instructions onto the computing device 400, at least one of the processor 430 and/or the memory module 450 are changed, transforming the computing device 400 in part into a particular machine or apparatus, for example, a localized sensor quality analysis and control system having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by design rules well-known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, procedural programming languages, such as the "C" programming language, and functional programming languages such as Haskell or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider (ISP)). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. For example, while at least some of the above descriptions of various embodiments have made reference to weather conditions or characteristics, weather sensors, environmental conditions, or the like, such reference is meant to be merely illustrative and the various embodiments disclosed herein may be equally applicable to any form of sensor or sensor suites capable of communicating amongst themselves and performing quality control and calibration operations in an Internet-independent manner. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other intervening devices and/or connections. Unless otherwise stated, "about," "approximately," or "substantially" preceding a value means +/−10 percent of the stated value or reference.

What is claimed is:

1. A local sensor device comprising:
   a memory comprising executable instructions; and
   a processor coupled to the memory and configured to execute the instructions to:
      receive a broadcast including measurement data captured by a second local sensor device;
      verify integrity of the measurement data;
      perform a quality control analysis on the measurement data by analyzing the measurement data using a quality control algorithm to form an analysis result without uploading the measurement data to a centralized server;
      generate a response for broadcasting the analysis result, wherein the response comprises:
         a determination of pass when the quality control analysis indicates that the measurement data passes the quality control analysis; and
         a determination of fail, a suspected cause of the failure, and a recommended resolution for the suspected cause of the failure when the quality control analysis indicates that the measurement data fails the quality control analysis; and
      broadcast the analysis result.

2. The local sensor device of claim 1, wherein the broadcast including measurement data captured by the second local sensor device is received via data link layer communication, and wherein broadcasting the analysis result is performed via the data link layer communication.

3. The local sensor device of claim 1, wherein the broadcast including the measurement data further includes an electronic address of the second local sensor device, an identification of the measurement data, a timestamp indicating when the measurement data was captured by the second local sensor device, a geographic location data of the second local sensor device, a signature of the second local sensor device, and a cyclic redundancy check (CRC) code.

4. The local sensor device of claim 1, wherein the response for broadcasting the analysis result further includes an electronic address of the apparatus, an identification of the measurement data for which the quality control analysis was performed, a timestamp indicating when the quality control analysis was performed, a confidence level in the determination, a signature of the apparatus, and a cyclic redundancy check (CRC) code.

5. The local sensor device of claim 1, wherein the recommended resolution for the suspected cause of the failure comprises an instruction that instructs the second local sensor device to perform a recalibration.

6. The local sensor device of claim 5, wherein the recalibration comprises at least one of a self-cleaning operation of the first sensor or a repositioning of the second local sensor device.

7. The local sensor device of claim 1, wherein the processor further saves at least one of the analysis result or the measurement data to a state table stored in the memory after performing the quality control analysis on the measurement data.

8. The local sensor device of claim 7, wherein the processor performing the quality control analysis further includes analyzing the measurement data at least partially according to data obtained from the state table stored in the memory and corresponding to a third local sensor device locationally proximate to the second local sensor device.

9. The local sensor device of claim 1, wherein the processor performing the quality control analysis further includes analyzing the measurement data at least partially according to data obtained from the state table stored in the memory and corresponding to second measurement data previously captured by the local sensor device.

10. A computer program product for localized sensor quality analysis and control, the computer program product comprising a computer readable storage medium having program instructions embodied therewith, the program instructions executable by a processor of a local sensor device to cause the processor to:
   receive a broadcast including measurement data captured by a second local sensor device;
   verify integrity of the measurement data;
   perform a quality control analysis on the measurement data by analyzing the measurement data using a quality control algorithm to form an analysis result without uploading the measurement data to a centralized server;
   generate a response for broadcasting the analysis result, wherein the response comprises:
      a determination of pass when the quality control analysis indicates that the measurement data passes the quality control analysis; and
      a determination of fail, a suspected cause of the failure, and a recommended resolution for the suspected cause of the failure when the quality control analysis indicates that the measurement data fails the quality control analysis; and
   broadcast the analysis result.

11. The computer program product of claim 10, wherein the recommended resolution for the suspected cause of the failure directs the second local sensor device to perform a calibration based at least partially on the suspected cause of the failure and the recommended resolution for the suspected cause of the failure.

12. The computer program product of claim 10, wherein the quality control algorithm is a proprietary quality control algorithm published in a software development kit (SDK) at least partially executed by the computer program product.

13. The computer program product of claim 10, wherein the processor receives the broadcast including the measurement data and broadcasts the analysis result at a data link layer independent of Internet-based communications.

\* \* \* \* \*